(12) United States Patent
Anderson

(10) Patent No.: US 8,298,659 B2
(45) Date of Patent: Oct. 30, 2012

(54) POLYSILOXANE COATINGS DOPED WITH AMINOSILANES

(75) Inventor: Jerrel C. Anderson, Vienna, WV (US)

(73) Assignee: E I du Pont de Nemours and Company, Wilmington, DE (US)

( * ) Notice: Subject to any disclaimer, the term of this patent is extended or adjusted under 35 U.S.C. 154(b) by 829 days.

(21) Appl. No.: 12/286,393

(22) Filed: Sep. 30, 2008

(65) Prior Publication Data

US 2010/0080983 A1 Apr. 1, 2010

(51) Int. Cl.
- C08K 5/54 (2006.01)
- B32B 9/04 (2006.01)
- B32B 17/10 (2006.01)

(52) U.S. Cl. ......... 428/334; 428/447; 428/451; 524/188

(58) Field of Classification Search .................. 428/334, 428/447, 451; 524/188
See application file for complete search history.

(56) References Cited

U.S. PATENT DOCUMENTS

| | | | |
|---|---|---|---|
| 3,404,134 A | 10/1968 | Rees | |
| 3,986,997 A | 10/1976 | Clark | |
| 4,027,073 A | 5/1977 | Clark | |
| 4,073,967 A | 2/1978 | Sandvig | |
| 4,177,315 A | 12/1979 | Ubersax | |
| 4,211,823 A | 7/1980 | Suzuki et al. | |
| 4,355,135 A | 10/1982 | January | |
| 4,469,743 A | 9/1984 | Hiss | |
| 4,499,224 A | 2/1985 | Anthony et al. | |
| 4,540,634 A | 9/1985 | Ashlock et al. | |
| 4,615,989 A | 10/1986 | Ritze | |
| 4,898,786 A | 2/1990 | Swofford | |
| 4,954,396 A | 9/1990 | Swofford et al. | |
| 5,028,674 A | 7/1991 | Hatch et al. | |
| 5,069,942 A * | 12/1991 | Anderson | 427/387 |
| 5,173,212 A | 12/1992 | Speit et al. | |
| 5,264,286 A | 11/1993 | Ando et al. | |
| 5,275,645 A | 1/1994 | Ternoir et al. | |
| 5,342,658 A | 8/1994 | Hong et al. | |
| 5,411,845 A | 5/1995 | Robinson | |
| 5,415,942 A | 5/1995 | Anderson | |
| 5,567,529 A | 10/1996 | Smith | |
| 5,690,994 A | 11/1997 | Robinson | |
| 5,698,329 A | 12/1997 | Robinson | |
| 5,698,619 A | 12/1997 | Cohen et al. | |
| 5,763,089 A | 6/1998 | Chaussade et al. | |
| 5,770,312 A | 6/1998 | Robinson | |
| 6,099,971 A | 8/2000 | Faris et al. | |
| 6,140,414 A | 10/2000 | Ohsawa et al. | |
| 6,150,028 A | 11/2000 | Mazon | |
| 6,255,429 B1 | 7/2001 | Griffin et al. | |
| 6,329,456 B1 * | 12/2001 | Okibe et al. | 524/264 |
| 6,340,646 B1 | 1/2002 | Nagashima et al. | |
| 6,432,191 B2 | 8/2002 | Schutt | |
| 6,461,736 B1 | 10/2002 | Nagashima et al. | |
| 6,468,934 B2 | 10/2002 | Nagashima et al. | |
| 6,500,888 B2 | 12/2002 | Baumgartner et al. | |
| 6,518,365 B1 | 2/2003 | Powell et al. | |
| 6,602,379 B2 | 8/2003 | Li et al. | |
| 7,189,457 B2 * | 3/2007 | Anderson | 428/423.1 |
| 7,294,401 B2 | 11/2007 | Anderson et al. | |
| 2007/0144654 A1 | 6/2007 | Anderson et al. | |
| 2007/0154723 A1 | 7/2007 | Anderson et al. | |
| 2007/0160852 A1 | 7/2007 | Anderson et al. | |
| 2008/0318063 A1 | 12/2008 | Anderson | |
| 2009/0087669 A1 | 4/2009 | Hayes et al. | |

FOREIGN PATENT DOCUMENTS

| | | |
|---|---|---|
| EP | 101326 A1 | 2/1984 |
| EP | 157030 A1 | 10/1985 |
| GB | 2044787 A | 10/1980 |
| WO | 80/01007 A1 | 5/1980 |
| WO | 83/04002 A1 | 11/1983 |
| WO | 93/19130 A1 | 9/1993 |
| WO | 2004/020525 A1 | 3/2004 |
| WO | 2005/007763 A1 | 1/2005 |

OTHER PUBLICATIONS

Standard Test Methods for Measuring Adhesion by Tape Test, Designation D 3359-08, May 2008, ASTM International.
Dupont Spallshield Composite, Product Information, 2006, Dupont.

* cited by examiner

*Primary Examiner* — Michael M Bernshteyn

(57) ABSTRACT

A polysiloxane coating composition comprises (a) about 5 to about 50 wt % of solids complementally comprising about 2 to about 30 wt % of a silica; about 0.25 to about 7 wt % of a partial condensate of an aminosilane; and about 2 to about 90 wt % of a partial condensate of a tri-functional silane having the formula $RSi(OR')_3$, wherein R is selected from the group consisting of alkyl, vinyl, and aryl radicals and R' is selected from the group consisting of H., alkyl radicals having 1 to 4 carbons, and alkylcarbonyl radicals having 1 to 4 carbons; and (b) about 50 to about 95 wt % of solvent comprising about 10 to about 90 wt % of a lower aliphatic alcohol and about 10 to about 90 wt % of water. The coating composition has a pH level in the range of about 2 to about 6.

23 Claims, No Drawings

POLYSILOXANE COATINGS DOPED WITH AMINOSILANES

FIELD OF THE INVENTION

The invention relates to a polysiloxane protective coating composition. More particularly, the coating composition comprises an aminosilane. It has improved adhesion and reduced blistering when applied to a variety of substrates.

BACKGROUND OF THE INVENTION

Several patents and publications are cited in this description in order to more fully describe the state of the art to which this invention pertains. The entire disclosure of each of these patents and publications is incorporated by reference herein.

A variety of polymeric materials are used in structural and laminating applications that require optical clarity. For example, polymeric films or sheets made of acrylic polymers, polycarbonates, and polyesters are increasingly being used in glazing applications. While these clear plastic substrates may perform their structural function for extended periods of time, they are subject to surface scratching which can in turn mar their appearance and optical clarity. Accordingly, abrasion resistant hardcoats are often applied to protect the substrates.

One type of abrasion resistant hardcoat is derived from a polysiloxane coating composition made by hydrolyzing a tri-functional silane (e.g., methyltrimethoxysilane) in a mildly acidified colloidal silica solution (see e.g., U.S. Pat. Nos. 3,986,997; 4,027,073; 4,177,315; 4,355,135; 5,069,942 and European Pat. No. EP0157030). Past studies found that this type of polysiloxane based hardcoat adheres only moderately well to some substrates, in particular poly(ethylene terephthalate) (PET) films. Therefore, to improve adhesion, the poly(ethylene terephthalate) substrate films may be treated to enhance adhesion before the hardcoat is applied. One type of adhesion enhancement is to apply a layer of poly(alkyl amines), such as those described in U.S. Pat. Nos. 5,411,845; 5,770,312; 5,690,994; 5,698,329; and 7,189,457. Under high temperature and high humidity conditions, however, some polysiloxane hardcoats fail to maintain adequate adhesion to the poly(alkyl amine) primed substrates. There is still a need to further improve the polysiloxane coating composition to enhance the adhesion between the hardcoat and the poly(alkyl amine) primed substrates under various conditions.

SUMMARY OF THE INVENTION

Provided herein is a polysiloxane coating composition comprising (a) about 5 to about 50 wt % of solids complementally comprising about 2 to about 30 wt % of a silica, about 0.25 to about 9 wt % of a partial condensate of an aminosilane, and about 2 to about 90 wt % of a partial condensate of a tri-functional silane having a formula $RSi(OR')_3$, wherein R is selected from the group consisting of alkyl, vinyl, and aryl radicals and R' is selected from the group consisting of H., alkyl radicals having 1 to 4 carbons, and alkylcarbonyl radicals having 1 to 4 carbons; and (b) about 50 to 95 wt % of a solvent comprising about 10 to about 90 wt % of a lower aliphatic alcohol and about 10 to about 90 wt % of water; and wherein the coating composition is prepared by, (i) dispersing and mixing the tri-functional silane into a water-based solution of polysilicic acid or a colloidal suspension of silica, which has a pH level of about 2 to about 6, to form a bath A;

(ii) dispersing and mixing the aminosilane into water, which is acidified to a pH level of about 2 to about 6, to form formation a bath B; and (iii) diluting the baths A and B with a mixture of the lower aliphatic alcohol and water and combining the diluted baths A and B to form the coating composition.

Further provided herein is an article comprising a substrate, wherein at least one side of the substrate is coated with a primer comprising a poly(alkyl amine) and over which an abrasion resistant hardcoat is formed from the polysiloxane coating composition.

Yet further provided herein is a multilayer laminate article, such as safety glazing, comprising the coated article.

DETAILED DESCRIPTION OF THE INVENTION

The following definitions apply to the terms as used throughout this specification, unless otherwise limited in specific instances.

The technical and scientific terms used herein have the meanings that are commonly understood by one of ordinary skill in the art to which this invention belongs. In case of conflict, the present specification, including the definitions herein, will control.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format. Optional additives as defined herein, at a level that is appropriate for such additives, and minor impurities are not excluded from a composition by the term "consisting essentially of". When a composition, a process, a structure, or a portion of a composition, a process, or a structure, is described herein using an open-ended term such as "comprising," unless otherwise stated the description also includes an embodiment that "consists essentially of" or "consists of" the elements of the composition, the process, the structure, or the portion of the composition, the process, or the structure.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; that is, the phrase "A or B" means "A, B, or both A and B". More specifically, a condition "A or B" is satisfied by any one of the following: A is true (or present) and B is false (or not present); A is false (or not present) and B is true (or present); or both A and B are true (or present). Exclusive "or" is designated herein by terms such as "either A or B" and "one of A or B", for example. In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

The term "complemental" and its derivatives, for example "complementally", are used optionally herein to refer to amounts that sum to 100%, 100 wt %, or 100 mol %. By laws of stoichiometry or by formulation principles, however, some amounts will sum to 100% without being described herein as "complemental".

Finally, unless stated otherwise, all percentages, parts, ratios, and like amounts, are defined by weight.

Provided herein is a polysiloxane coating composition, which, when applied over a poly(alkyl amine) primed substrate (e.g., a polyester film), forms an abrasion resistant hardcoat with improved adhesion strength under various conditions. Specifically, the coating composition has a pH level in the range of about 2 to about 6, or about 3 to about 5.5, or about 3 to about 5, and comprises (i) about 50 to about 95 wt % solvent and (ii) about 5 to about 50 wt % solids. The solvent comprises water and a lower aliphatic alcohol. The solids comprise silica, partial condensate of a tri-functional silane, and partial condensate of an aminosilane.

The solvent comprises a mixture of water and one or more lower aliphatic alcohols and has a water:alcohol ratio in the range of 1:9 to 9:1 by weight. The lower aliphatic alcohols are those having from 1 to 4 carbon atoms, such as methanol, ethanol, n-propanol, iso-propanol, n-butanol, sec-butanol, and tertiary butanol. The solvent may further comprise sufficient acid to maintain a pH level of about 2 to about 6, or about 3 to about 5.5, or about 3 to about 5. Suitable acids include aliphatic acids such as acetic acid, propionic acid, butyric acid, citric acid, and the like.

Silica suitable for use in the compositions described herein can be obtained, for example, by the hydrolysis of tetraethyl orthosilicate to form polysilicic acid. The hydrolysis can be carried out using conventional procedures, for example, by the addition of an aliphatic alcohol and an acid to the tetraethyl orthosilicate. Alternatively, colloidal silica having a particle size of about 5 to about 50 nanometers (nm), or about 7 to about 25 nm, or about 7 to about 15 nm may be used. The alkalinity (e.g., titratable $Na_2O$ content) of the colloidal silica dispersions should generally be less than about 1 wt %, or less than about 0.6 wt %, or less than about 0.4 wt %, or less than about 0.2 wt %, based on the total weight of the colloidal silica suspension. In some preferred coating compositions, the colloidal silica is essentially free of alkali metal ions. In this context, the term "essentially free" means that less than about 0.02 wt % of alkali metal ions, based on the total weight of the suspension, is present in the colloidal silica.

Suitable colloidal silicas include those commercially available from E.I. du Pont de Nemours and Company of Wilmington, Del. (hereinafter "DuPont") under the trademarks Ludox® SM, Ludox® HS-30, and Ludox® LS. The silica typically makes up about 2 to about 45 wt %, or about 2 to about 30 wt %, or about 4 to about 20 wt %, or about 5 to about 15 wt %, of the solids within the curable coating composition.

The tri-functional silane used here has the general formula $RSi(OR')_3$, wherein —OR' is the functional group, and wherein R is selected from alkyl, vinyl, and aryl radicals and R' is selected from H. and alkyl radicals having 1 to 4 carbons. In certain preferred coating compositions, R is selected from alkyl radicals having 1 to 4 carbons. More preferably, about 60% of the R radicals, or about 80% to about 100% of the R radicals, are methyl radicals. Suitable tri-functional silanes are well known within the art and readily available. For example, Z-6070, Z-6124, Z-6300, and Z-6518 silanes (available from the Dow Corning Corporation of Midland, Mich. (hereinafter "Dow Corning")) and Silquest™ A-162 and A-1630 silanes (available from Momentive Performance Materials of Wilton, Conn. (hereinafter "Momentive")) may be used in the coating compositions.

Suitable aminosilanes include silanes with one or more amine functional groups, such as those commercially available from Dow Corning Corporation under the tradenames Z-6011, Z-6020, Z-6137, and Z-6032 and those available from Momentive under the tradenames Silquest™ A-1110, A-1120, and A-1130.

The partial condensate of the tri-functional silane is generated in situ by adding the corresponding tri-functional silane, such as a trialkoxyalkylsilane, to an aqueous dispersion of colloidal silica. Upon hydrolysis, the trialkoxyalkylsilane liberates the corresponding alcohol and forms a silane triol, $RSi(OH)_3$, which is further condensed to form —Si—O—Si-bonds. Such condensation is not complete, but rather the reaction product retains an appreciable quantity of silicon-bonded hydroxyl groups; thus, it is soluble in the water/alcohol based solvent. This soluble partial condensate can be characterized as a siloxanol polymer having at least one silicon-bonded hydroxyl group for every two to four —SiO— units. During curing of the coating composition, these residual hydroxyls are further condensed to yield a silsesquioxane, $[RSiO_{1.5}]_x$.

The partial condensate of the tri-functional silane typically makes up about 2 to about 90 wt %, or about 3 to about 70 wt %, or about 4 to about 60 wt %, or about 5 to about 20 wt % of the solids in the coating composition.

Similarly, the partial condensate of the aminosilane is generated in situ by adding the aminosilane into an aqueous solvent. The partial condensate of the aminosilane typically makes up about 0.25 to about 9 wt %, or about 0.5 to about 7 wt %, or about 0.75 to about 5 wt %, or about 1 to about 5 wt % of the solids within the coating composition.

The polysiloxane coating composition may further comprise about 0.01 to about 1.5 wt %, or about 0.05 to about 1 wt %, or about 0.1 to about 0.5 wt %, of a curing catalyst, based on the total weight of the composition. A wide variety of curing catalysts may be used. Representative curing catalysts include the alkali metal salts of carboxylic acids (e.g., sodium acetate, potassium acetate, sodium formate, and potassium formate) and quaternary ammonium carboxylates (e.g., benzyltrimethylammonium acetate and tetramethylammonium acetate). Preferably, the coating composition is essentially free of alkali metals. Accordingly, the curing catalysts are preferably quaternary ammonium carboxylates.

The polysiloxane coating composition may be prepared in a three-step process. First, a polysiloxane main bath comprising silica and the partial condensate of the tri-functional silane in an acidic water/alcohol solution is prepared. Then, a dopant bath of the partial condensate of the aminosilane in an acidic water or water/alcohol solution is prepared. And finally, the coating composition is made by combining the main bath and the dopant bath, optionally in the presence of the curing catalyst(s).

The polysiloxane main bath of silica and the partial condensate of the tri-functional silane may be prepared by a wide variety of techniques, depending on the particular starting materials used. For example, the tri-functional silane can be hydrolyzed in a solution of pre-hydrolyzed polysilicic acid. Alternatively, the tri-functional silane can be pre-hydrolyzed in a solvent and then added to a solution of polysilicic acid. Still another alternative is the co-hydrolysis of the tri-functional silane and the tetraethyl orthosilicate together in the solvent. If a colloidal silica is used as the silica source, the tri-functional silane may be combined with the silica either through the pre-hydrolysis of the tri-functional silane. Alternatively, the main bath of silica may be prepared by hydrolyzing the tri-functional silane in the presence of acidified colloidal silica dispersion. It is important to note that, during the hydrolysis process, an acidic environment is maintained, and that the final main bath has a pH level in the range of about 2 to about 6, or about 3 to about 5.5, or about 3 to about 5. The pH of the bath can be adjusted according to techniques well known to those skilled in the art, including the addition of an acidic or basic solution. Acids preferred in the invention for the adjustment of the pH are aliphatic acids (e.g., acetic and n-propionic acids).

Preferably, the main polysiloxane bath is a single phase bath. The term "single phase" as used herein to refer to the polysiloxane bath does not exclude the presence of colloidal silica particles, but merely refers to the phase of the medium or solution in which the colloidal particles are suspended. In particular, when the tri-functional silane(s) are added to the acidified colloidal suspension, a second phase is typically formed, because the silane(s) are less dense than and immiscible with water. This floating second phase is depleted as the hydrolysis of the silane(s) proceeds, because the hydrolyzed silane(s), such as alkyltrihydroxysilane(s), are soluble in the aqueous phase. If the colloidal silica bath is highly acidic, for example below 4.0 pH, the hydrolysis may proceeds very quickly. At a higher pH of 4.9, it may take up to 4 hours to complete.

The dopant bath of the aminosilanol may be prepared by hydrolyzing the corresponding aminosilane in an acidified solvent made of water, or a mixture of water and the lower aliphatic alcohol. Here again, an acidic environment is maintained during the hydrolyzing process and the final single-phase dopant bath has a pH level in the range of about 2 to about 6, or about 3 to about 5.5, or about 3 to about 5. Aliphatic acids are also preferred for use in the dopant bath.

In the final step of the process, the polysiloxane main bath and the aminosilane dopant bath are combined and mixed to form the final coating composition, which has a final pH level in the range of about 2 to about 6, or about 3 to about 5.5, or about 3 to about 5. In certain processes, the components used in the main and dopant baths are de-ionized and essentially free of alkali metal ions and a curing catalyst, such as a quaternary ammonium carboxylate, is added when the two baths are combined. In some preferred processes, the main bath or the dopant bath is a single-phase solution.

The invention further provides an article comprising a solid substrate, wherein at least one side of the substrate is coated with a layer of a poly(alkyl amine) primer and over the primer layer is a layer of the polysiloxane coating composition described above. The substrate may be fully or partially coated by the primer or the polysiloxane coating solution. At least a portion of the primer layer, however, must be coated with the polysiloxane coating composition layer. Upon drying or curing, the polysiloxane coating composition layer forms an abrasion resistant hardcoat.

Suitable substrates include, but are not limited to, wood, metal, printed surfaces, leather, glass, ceramics, textiles, and polymeric films and sheets. The substrates are preferably polymeric films or sheets (or dimensionally stable films or sheets) formed of acrylic polymers (e.g., poly(methylmethacrylate)), polyesters (e.g., poly(ethylene terephthalate), polycarbonates (e.g., poly(diphenylol-propane) carbonate and poly(diethylene glycol bis allyl)carbonates), polyamides, polyimides, acrylonitrile-styrene copolymers, styrene-acrylonitrile-butadiene copolymers, polyvinyl chloride, butyrates, polyethylene, and the like.

Transparent polymeric materials coated with the abrasion resistant hardcoat described herein are useful as flat or curved enclosures, such as window, skylights and windshields, especially for transportation equipment. Plastic lenses, such as acrylic or polycarbonate ophthalmic lenses, can also be coated with the abrasion resistant hardcoat. In certain articles, the substrates are polyester films, such as poly(ethylene terephthalate) films (non oriented, uni-axially oriented, or bi-axially oriented poly(ethylene terephthalate) films). In these articles, the polyester films may have a thickness of about 1 to about 10 mils (about 0.025 to about 0.25 mm), or about 2 to about 8 mils (about 0.051 to about 0.2 mm), or about 5 to about 8 mils (0.13 to about 0.2 mm).

The poly(alkyl amine) primers used herein comprise one or more poly(alkyl) amines such as those derived from α-olefin comonomers having 2 to 10 carbon atoms, including, without limitation, ethylene, propylene, 1-butene, 1 pentene, 1-hexene, 1-heptene, 3 methyl-1-butene, 4-methyl-1-pentene, and mixtures thereof. More particularly, the poly(alkyl amine) may be selected from poly(allyl amines) and poly(vinyl amines) (e.g., linear poly(vinyl amine) available from BASF Corporation, Florham Park, N.J. under the tradename LUPAMIN™ 9095). In certain embodiments, the poly(alkyl amine) is a poly(allyl amine), or linear poly(allyl amine).

The poly(alkyl amine) primers may be applied onto the substrates through any suitable technique. For example, the poly(alkyl amine) primer, and its application to polyester films are described in U.S. Pat. Nos. 5,411,845; 5,770,312; 5,690,994; 5,698,329; and 7,189,457. The thickness of the poly(alkyl amine) primer layer on the substrates may be up to about 1,000 nm, or about 0.2 to about 1,000 nm, or about 5 to about 500 nm, or about 10 to about 200 nm.

Likewise, the polysiloxane coating composition can be applied to the substrate by any suitable conventional method, such as flowing, spraying, or dipping to form a continuous surface film. After sufficient drying (e.g., at room temperature for about 30 minutes or longer), or optionally, after curing at about 65° C. or higher or about 90° C. or higher for about 2 seconds or longer, a polysiloxane based abrasion resistant hardcoat will be formed over the poly(alkyl amine) primed substrate surface.

The thickness of the abrasion resistant hardcoat can be varied by the particular application and in some articles may be up to about 100 µm, or about 0.5 to about 20 µm, or about 1 to about 5 µm, or about 1.5 to about 3.0 µm, or about 2.0 to about 2.5 µm. Thinner hardcoats may be obtained by spin coating.

Yet further provided is a laminate article comprising a layer of a polymeric film (e.g., a poly(ethylene terephthalate) film) that has a first surface. The first surface is wholly or partially coated with a poly(alkyl amine) primer. An abrasion resistant hardcoat formed from the polysiloxane coating composition described above is disposed over at least a portion of the poly(alkyl amine) primer. One or more other film or sheet layers is laminated to a second surface of the polymeric film. Preferably, the second surface is not coated with the abrasion resistant hardcoat. In certain preferred laminate articles, the second surface of the polymeric film, which is adjacent to the one or more other film or sheet layers, is also coated with the poly(alkyl amine) primer, but not the abrasion resistant hardcoat.

Alternatively, the laminate article may be a safety laminate comprising (a) a layer of polymeric film (e.g., a polyester film) that has its outside surface (i.e., the surface that is opposite from the interlayer sheet and forms a first outer surface of the laminate) wholly or partially coated with a poly(alkyl amine) primer and over at least a portion of which is disposed the abrasion resistant hardcoat; (b) at least one polymeric interlayer sheet that is laminated to the inside surface of the hardcoated polymeric film; and (c) a rigid sheet or an additional film layer laminated to the at least one polymeric interlayer sheet. In such an article, the inside surface of the hardcoated polymeric film is optionally also primed with the poly(alkyl amine) primer.

In a further configuration, the safety laminate may comprise (a) a layer of the polymeric film (e.g., a polyester film) that has its outside surface wholly or partially coated with a poly(alkyl amine) primer and over at least a portion of which is disposed the abrasion resistant hardcoat; (b) at least one polymeric interlayer sheet that is laminated to the inside surface of the coated polymeric film; and (c) laminated to the at least one polymeric interlayer sheet, n plies of the rigid sheet or additional film layers which are interspaced by n−1 plies of additional polymeric interlayer sheets, wherein $1 \leq n \leq 7$. When used as an integral subunit of a laminate, this configuration of rigid sheets or additional film layers interleaved by additional polymeric interlayer sheets may be referred to as an "intermediate assembly." In such safety laminates, the inside surface of the hardcoated polymeric film may optionally also be primed with the poly(alkyl amine) primer.

The additional film layers may be metal, such as aluminum foil, or polymeric. Polymeric film materials include, but are not limited to, polyesters (e.g., poly(ethylene terephthalate)), poly(ethylene naphthalate), polycarbonate, polyolefins (e.g., polypropylene, polyethylene, and cyclic polyolefins), norbornene polymers, polystyrene (e.g., syndiotactic polystyrene), styrene-acrylate copolymers, acrylonitrile-styrene copolymers, polysulfones (e.g., polyethersulfone, and polysulfone), polyamides, polyurethanes, acrylic polymers, cellulose acetates (e.g., cellulose acetate and cellulose triacetates), cellophane, vinyl chloride polymers (e.g., polyvinylidene chloride and vinylidene chloride copolymers), fluoropolymers (e.g., polyvinyl fluoride, polyvinylidene fluoride, polytetrafluoroethylene, and ethylene-tetrafluoroethylene copolymers), and combinations of two or more thereof. In certain embodiments, the additional polymeric film is a bi-axially oriented poly(ethylene terephthalate) film. When the additional polymeric film is located at the outside surface of the laminate, it may be further coated with the polysiloxane based abrasion resistant hardcoat, as described above, on its outside surface.

A layer of solar control material may be applied to the whole or a part of at least one surface of the additional film layer or of the hardcoated polymeric film. Suitable solar control materials may be infrared absorbing materials, such as metal oxide nanoparticles (e.g., antimony tin oxide nanoparticles, indium tin oxide nanoparticles, or combinations thereof), metal boride nanoparticles (e.g., lanthanum hexaboride nanoparticles), or combinations thereof. The polymeric films may also be coated with an infrared energy reflective layer, such a metal layer, a Fabry-Perot type interference filter layer, a layer of liquid crystals, or combinations of two or more thereof. When present on a film bearing a hardcoat, the solar control layer is preferably applied to the surface opposite the hardcoat. Alternatively, the solar control layer may preferably be disposed between the film and the hardcoat.

The rigid sheets used herein comprise a material with a modulus of about 100,000 psi (690 MPa) or greater (as determined in accordance with ASTM D-638). The rigid sheets include, but are not limited to, glass sheets, metal sheets, ceramic sheets, and polymeric sheets derived from polycarbonate, acrylic, polyacrylate, poly(methyl methacrylate), cyclic polyolefins (e.g., ethylene norbornene polymers), polystyrene (preferably metallocene-catalyzed), or combinations of two or more thereof. In certain embodiments, the rigid sheet is made of glass.

The term "glass", as used herein, refers to window glass, plate glass, silicate glass, sheet glass, low iron glass, and float glass, and also includes colored glass, specialty glass which includes ingredients to control, for example, solar heating, coated glass with, for example, sputtered metals, such as silver or indium tin oxide, for solar control purposes, low-E glass, Toroglas™ glass (Saint-Gobain N.A. Inc., Trumbauersville, Pa.), Solexia™ glass (PPG Industries, Pittsburgh, Pa.) and the like. Such specialty glasses are described in, e.g., U.S. Pat. Nos. 4,615,989; 5,173,212; 5,264,286; 6,150,028; 6,340,646; 6,461,736; and 6,468,934. The glass may also include frosted or etched glass sheets. Suitable frosted and etched glass sheets are articles of commerce and are well known in the art. The type of glass to be selected for a particular laminate depends on the intended use. Preferably, the glass used herein is in the form of sheets.

The polymeric interlayer sheets may comprise any suitable polymeric material(s) including, but not limited to, poly(vinyl acetals), poly(vinyl chlorides), polyurethanes, poly(ethylene vinyl acetates), acid copolymers of α-olefins and α,β-unsaturated carboxylic acids having from 3 to 8 carbons, and ionomers derived from partially or fully neutralized acid copolymers of α-olefins and α,β-unsaturated carboxylic acids having from 3 to 8 carbons, or combinations of two or more thereof. In addition, the polymeric interlayer sheets comprised by the safety laminates may be formed of same or different polymeric materials.

Poly(vinyl acetal) is made by condensation of polyvinyl alcohol with an aldehyde, such as acetaldehyde, formaldehyde, or butyraldehyde. When used as the interlayer material, a suitable amount of one or more plasticizers is comprised by the poly(vinyl acetal) composition. The poly(vinyl acetal) compositions used as interlayer materials herein may also be acoustic grade compositions. By "acoustic" it is meant that the poly(vinyl acetal) composition has a glass transition temperature (Tg) of 23° C. or less, or about 20° C. to about 23° C.

The ionomers used herein may be produced by partially neutralizing precursor acid copolymers of α-olefins and one or more α,β-ethylenically unsaturated carboxylic acid having 3 to 8 carbons. In certain materials, the precursor acid copolymers comprise about 15 to about 30 wt %, or about 18 to about 25 wt %, or about 18 to about 23 wt %, of the copolymerized units of α,β-ethylenically unsaturated carboxylic acids. The α-olefins may be those having about 2 to about 10 carbon atoms, or may be selected from ethylene, propylene, 1-butene, 1-pentene, 1-hexene, 1 heptene, 3 methyl-1-butene, 4-methyl-1-pentene, and mixtures thereof. In certain preferred materials, the α-olefin is ethylene and the α,β-ethylenically unsaturated carboxylic acid is selected from acrylic acid, methacrylic acid, itaconic acid, maleic acid, maleic anhydride, fumaric acid, monomethyl maleic acid, and mixtures of two or more thereof.

The precursor acid copolymers may be polymerized as described in U.S. Pat. Nos. 3,404,134; 5,028,674; 6,500,888; and 6,518,365, for example.

To produce the ionomers, about 100%, or less than 100%, or about 5 to about 90%, or about 10 to about 50%, or about 20 to about 40%, of the carboxylic acid moieties in the precursor acid copolymers are neutralized, based on the total number of equivalents of carboxylic acid moieties in the precursor acid copolymers. Upon neutralization with basic metal compounds, the ionomers will contain one or more metallic cations. Metallic ions that are suitable cations may be monovalent, divalent, trivalent, multivalent, or mixtures therefrom. Useful monovalent metallic ions include, but are not limited to, ions of sodium, potassium, lithium, silver, mercury, copper, and mixtures thereof. Useful divalent metallic ions include, but are not limited to, ions of beryllium, magnesium, calcium, strontium, barium, copper, cadmium, mercury, tin, lead, iron, cobalt, nickel, zinc, and mixtures therefrom. Useful trivalent metallic ions include, but are not limited to, ions of aluminum, scandium, iron, yttrium, and mixtures therefrom. Useful multivalent metallic ions include, but are not limited to, ions of titanium, zirconium, hafnium, vanadium, tantalum, tungsten, chromium, cerium, iron, and mixtures therefrom. It is noted that when the metallic ion is multivalent, complexing agents, such as stearate, oleate, salicylate, and phenolate radicals may be included. The precursor acid copolymers may be neutralized as described in U.S. Pat. No. 3,404,134, for example.

The polymeric compositions used in the interlayer sheet may further comprise one or more suitable additives. The additives may include fillers, plasticizers, processing aides, flow enhancing additives, lubricants, pigments, dyes, colorants, flame retardants, impact modifiers, nucleating agents, lubricants, antiblocking agents such as silica, slip agents, thermal stabilizers, UV absorbers, UV stabilizers, hindered amine light stablizers (HALS), dispersants, surfactants, chelating agents, coupling agents, adhesives, primers and the like.

The polymeric compositions may contain an effective amount of a thermal stabilizer. Thermal stabilizers are well described within the art. Any thermal stabilizer may find utility herein. Preferable general classes of thermal stabilizers include phenolic antioxidants, alkylated monophenols, alkylthiomethylphenols, hydroquinones, alkylated hydroquinones, tocopherols, hydroxylated thiodiphenyl ethers, alkylidenebisphenols, O—, N- and S-benzyl compounds, hydroxybenzylated malonates, aromatic hydroxybenzyl compounds, triazine compounds, aminic antioxidants, aryl amines, diaryl amines, polyaryl amines, acylaminophenols, oxamides, metal deactivators, phosphites, phosphonites, benzylphosphonates, ascorbic acid (vitamin C), compounds which destroy peroxide, hydroxylamines, nitrones, thiosynergists, benzofuranones, indolinones, and mixtures thereof. This should not be considered limiting. Essentially any thermal stabilizer can be used. The compositions may incorporate up to about 1.0 wt % of thermal stabilizers, based on the total weight of the composition.

The polymeric compositions may contain an effective amount of UV absorber(s). UV absorbers are well described within the art. UV absorbers include benzotriazoles, hydroxybenzophenones, hydroxyphenyl triazines, esters of substituted and unsubstituted benzoic acids, and the like and mixtures thereof. This should not be considered limiting. Essentially any UV absorber may be used. The compositions may contain up to about 1.0 wt % of UV absorbers, based on the total weight of the composition.

The polymeric compositions may contain an effective amount of hindered amine light stabilizers. Hindered amine light stabilizers are generally well described within the art. Generally, hindered amine light stabilizers are described to be secondary, tertiary, acetylated, N hydrocarbyloxy substituted, hydroxy substituted N-hydrocarbyloxy substituted, or other substituted cyclic amines which further contain steric hindrance, generally derived from aliphatic substitution on the carbon atoms adjacent to the amine function. This should not be considered limiting. Essentially any hindered amine light stabilizer may be used. The compositions may contain up to about 1.0 wt % of hindered amine light stabilizers, based on the total weight of the composition.

The polymeric interlayer sheet may be in the form of a mono-layer sheet or a multi-layer sheet. When in the form of a multi-layer sheet, the individual sub-layers of the multi-layer polymeric interlayer may independently have any thickness. The polymeric interlayer sheet, as a whole, preferably has a total thickness of at least about 5 mils (0.1 mm), or at least about 30 mils (0.8 mm), or about 30 to about 200 mils (about 0.8 to about 5.1 mm), or about 45 to about 200 mils (about 1.1 to about 5.1 mm), or about 45 to about 100 mils (about 1.1 to about 2.5 mm), or about 45 to about 90 mils (about 1.1 to about 2.3 mm).

In a preferred article, the polymeric interlayer sheet comprises a poly(vinyl acetal) (e.g., a poly(vinyl butyral)) or an ionomer. In preferred articles having more than one interlayer sheet, the interlayer sheets are selected independently and may be poly(vinyl acetal) (e.g., a poly(vinyl butyral)) sheets, ionomer sheets, or a combination of poly(vinyl acetal) sheets and ionomer sheets. Moreover, when an article comprises more than one ionomer sheet, the ionomer or the ionomer composition may be the same or different in each of the ionomer sheets. Likewise, when an article comprises more than one poly(vinyl acetal) sheet, the poly(vinyl acetal) or the poly(vinyl acetal) composition may be the same or different in each of the poly(vinyl acetal) sheets.

The following examples are provided to describe the invention in further detail. These examples, which set forth a preferred mode presently contemplated for carrying out the invention, are intended to illustrate and not to limit the invention.

EXAMPLES

Material
- Colloidal silica solution: Ludox® LS, a 30% colloidal silica solution from DuPont;
- Methyltrimethoxysilane: SILQUEST™ A-1630 Silane from Momentive;
- γ-glycidoxypropyltrimethoxysilane: SILQUEST™ A-187 from Momentive;
- γ-aminopropyltrimethoxysilane (used in CE3, 4, 8, and 9, and E1-3): SILQUEST™ A-1100 from Momentive;
- γ-aminopropyltrimethoxysilane (used in CE11-12 and E4-6): from Sigma-Aldrich, Inc.;
- N-β-(aminoethyl)-γ-aminotrimethoxysilane: SILQUEST™ A-1120 from Momentive;
- IPA/$H_2O$ (2:1): a solution of 2 parts by weight of isopropyl alcohol and 1 part by weight of de-ionized water;
- Surfactant: SILWET™ L-720, a silicone-based surfactant from Momentive.
- 5% tetramethylammonium acetate (TMAA): a solution of 5% TMAA solids in IPA/$H_2O$ (2:1);
- Acidified 5% TMAA: the 5% TMAA solution further comprising 1% glacial acetic acid;
- Glacial acetic acid: ≧99.5% in water;
- Mixed ion-exchange resin beads: IONAC™ NM-60 from Sybron Chemicals Inc., Birmingham, N.J.;
- Water: unless otherwise specified, all water used in the Examples is de-ionized water.

Testing Methods:
- Haze and $T_{vis}$ were determined using HAZE GARD PLUS from BYK Gardner, Columbia, Md., in accordance with ASTM D1003-61;
- b* Color was determined by transmitted light using a ColorFlex™ Spectrocolorimeter (HunterLab, Reston, Va.) and calculated in accordance with CIE Equation and ASTM E308;
- Taber delta haze (abrasion resistance test) was determined using a Taber Abraser in accordance with ANSI Z26.1, test No. 34. Specifically, 4×4 in (10×10 cm) laminates were rotated 100 cycles under CS-10F abrader wheels using 500 g load, and haze was determined in accordance with ASTM D1003.61;
- The adhesion strength between the hardcoats and the PET films prior to and after immersing the laminates in boiling water for 6 hours were rated in accordance with ASTM method D3359-97;
- The hardcoat blistering was examined using a DIC microscope after immersing the laminates in boiling water for 6 hours and recorded as number of speckles (microblisters) per unit area.

Comparative Examples CE1 to CE5

Five (5) polysiloxane coating baths, CE1 through CE5, were prepared as follows.

CE1 was a prior art polysiloxane coating bath prepared by hydrolyzing a tri-functional silane in a colloidal solution of silica. The process for preparing CE1 included: (a) adding into a 400 ml glass bottle 70.86 g colloidal silica solution that was acidified to a pH of 4.9 using glacial acetic acid; (b) further adding 55.55 g methyltrimethoxysilane into the acidified colloidal silica solution to form a separate top layer; (c) stirring the two-phase bath using a TEFLON® (DuPont) coated magnetic stirring bar at a moderate rate for 4 hours and until the bath was clear and single-phased, meaning that the immiscible silane phase was depleted by reaction; (d) diluting the bath with 160.98 g IPA/$H_2O$ (2:1); and (e) adding 2 drops of surfactant into the final mixture. The thus obtained coating bath CE1 was further stirred slowly at room temperature for 72 hours before use.

CE2 was a prior art polysiloxane coating bath similar to CE1 and further doped with an epoxy-silane. In particular, CE2 was prepared following the process used in preparing CE1, with the exception that a mixture of methyltrimethoxysilane (52.29 g) and γ-glycidoxypropyl-trimethoxysilane (3.27 g) was added into the acidified colloidal silica solution in place of methyltrimethoxysilane alone.

Each of CE3, CE4 and CE5 was a polysiloxane coating bath doped with an aminosilane.

Similar steps described above with respect to CE2 were followed in preparing CE3, with the exception that a mixture of methyltrimethoxysilane (52.29 g) and γ-aminopropyltrimethoxysilane (2.48 g) were added to the acidified colloidal silica solution. With the addition of the silane mixture, however, the bath immediately gelled to form a white curdled mixture that was completely useless.

In preparing CE4, the acidified colloidal silica solution (70.86 g, pH=4.9) was further acidified with an additional 2.4 g glacial acetic acid, and into the further acidified colloidal silica was first added 2.48 g of γ-aminopropyltrimethoxysilane in a drop-wise fashion to avoid gellation and then 52.29 g of methyltrimethoxysilane. This was followed by a 4-hour-stirring, dilution with 160.98 g IPA/$H_2O$ (2:1), and addition of 2 drops of the surfactant. The resulting coating bath CE4 was further stirred for 72 hours before use. Compared to CE1 and CE2, CE4 was quite hazy but free of massive gellation.

CE5 was prepared similarly to CE4, except that an additional 3.94 g of glacial acetic acid was used to further acidify the already acidified colloidal silica solution (70.86 g, pH=4.9), and N-β-(aminoethyl)-γ-aminotrimethoxysilane was used in place of γ-aminopropyltrimethoxysilane. The resulting coating bath CE5 was cloudy but translucent.

Each of the coating baths CE1, CE2, CE4, and CE5 were stirred at room temperature for about 85 hours, applied onto clean glass microscope slides, and allowed to drip dry and rest for 24 hours at room temperature. The coated slides were then measured for haze. The results, tabulated in Table 1, demonstrate that the slides coated with CE1 and CE2 were clear and may be useful on films comprised in glazing applications. The coatings derived from CE4 and CE5, however, are too hazy to be useful. In addition, it is found that the addition of aminosilanes directly to colloidal silica solution, even when the solution is highly acidified, can cause massive gellation and therefore makes the final coating bath too hazy to be useful.

TABLE 1

| Coating Bath | Haze (%) |
|---|---|
| CE1 | 0.15 |
| CE2 | 0.13 |
| CE4 | 30.4 |
| CE5 | 12.5 |

Example E1

E1 was a polysiloxane coating bath doped with an aminosilane and having a low haze. It was prepared by separately hydrolyzing the tri-functional silane(methyltrimethoxysilane) in an acidified colloidal silica solution and the aminosilane in acidified water and then combining the two.

Specifically, a polysiloxane main bath was prepared by adding 52.29 g methyltrimethoxysilane into acidified colloidal silica solution (70.86 g, pH=4.9) and stirring the mixture at room temperature for 4 hours, and an aminosilane dopant bath was prepared by adding 2.48 g γ-aminopropyltrimethoxysilane into 40 g de-ionized water that was acidified with 1 g glacial acetic acid. The solution was allowed to hydrolyze for about 3 hours. The main bath was diluted with 81.06 g IPA/H$_2$O (2:1) followed by sufficient stirring and the dopant bath was diluted with 26.6 g IPA/H$_2$O (2:1) followed by sufficient stirring. Using an eyedropper and with rapid stirring, the diluted aminosilane dopant bath was added to the diluted polysiloxane main bath, below its surface, over about 10 minutes to form the final coating bath E1. No gelling took place, and the coating bath E1 had the typical slight bluish haze appearance that is normal for polysiloxane solutions.

Coating bath E1 was then aged for 72 hours and applied to a glass microscope slide. The coated slide had a haze level of 0.21%.

It is noted, however, that E1 contained an appreciable concentration of alkali metal ions, particularly sodium ions, which have been shown to contribute to the deterioration of the coating in outdoor weathering conditions. Thus, in a separate experiment, E1 was further de-ionized after the 72 hour aging step. Specifically, a glass column was filled half way with mixed ion-exchange resin beads that were hydrated and conditioned first with de-ionized water and then with IPA/H$_2$O (2:1). Coating bath E1, obtained as above, was then passed through the resin column. The de-ionized bath E1 exiting the column had a high pH of 9.65 and started to gel. A microscope slide coated with the dried de-ionized bath E1 gave a haze level of 98%.

Comparative Examples CE6 and CE7 and Example E2

In these examples, the colloidal silica solution was de-ionized before use. Specifically, the mixed ion-exchange resin beads were introduced into a glass column and conditioned with de-ionized water. The colloidal silica solution was then passed through the column and the de-ionized colloidal silica solution thereby had its pH reduced from 8.12 to 2.67.

Compositions for coating baths CE6, CE7 and E2 are listed in Table 2. Similarly to E1, these coating baths were made by separately preparing and combining the polysiloxane main baths and the epoxy- or aminosilane dopant baths.

TABLE 2

|  | CE6 | CE7 | E2 |
|---|---|---|---|
| Colloidal silica solution (de-ionized) (g) | 70.86 | 70.86 | 70.86 |
| Methyltrimethoxysilane (g) | 55.55 | 52.29 | 52.29 |
| γ-Aminopropyltrimethoxysilane (g) | 0 | 0 | 2.48 |
| γ-Glycidoxypropyltrimethoxysilane (g) | 0 | 3.27 | 0 |
| IPA/H$_2$O (2:1) (g) | 160.98 | 160.98 | 160.98 |

In particular, the polysiloxane main baths were prepared by hydrolyzing methyltrimethoxysilane in de-ionized colloidal silica solutions. Due to the high acidity of the de-ionized colloidal silica solution, the hydrolysis of methyltrimethoxysilane was completed in less than 5 minutes and considerable heat was generated during the process. Therefore each bath was momentarily immersed in an ice bath to cool it to room temperature. The baths were then stirred at room temperature for 3 to 4 hours, diluted with 107.32 g IPA/H$_2$O (2:1), and further stirred for thorough mixing. For CE6, 160.98 g IPA/H$_2$O (2:1) was used and the final coating bath was thus obtained.

For CE7 and E2, the epoxy- or aminosilane dopant bath was prepared by adding 3.27 g γ-glycidoxypropyltrimethoxysilane or 2.48 g γ-aminopropyltrimethoxysilane into 40 ml de-ionized water that had been acidified to pH 2.58 by 1 ml of glacial acetic acid. The bath was then stirred at room temperature for 3 hours, diluted with 53.66 g IPA/H$_2$O (2:1), and further stirred for thorough mixing.

Finally, except for CE6, using an eyedropper and with rapid stirring, the diluted epoxy- or aminosilane dopant bath was added to the polysiloxane main bath, below its surface, over 5 to 10 minutes to form the final coating baths CE7 and E2.

Each of the three coating baths (CE6, CE7 and E2) had a clear opalescent bluish color, with E2 being slightly more hazy in appearance. The pH values for each bath were 3.55 for CE6, 3.58 for CE7, and 4.87 for E2. In order to maintain the pH below 5, 5.46 g glacial acetic acid was added to bath E2, which had its pH stabilized at 4.85.

As these baths were free of metal ions, a curing catalyst, tetramethylammonium acetate (TMAA), was further added. In one set of the baths, 0.01538 ml of 5% TMAA was added for each gram of the coating bath. After catalysis, the pH values for each of the baths were 4.49 for CE6, 4.94 for CE7, and 4.74 for E2. The pH of each of these baths was adjusted to a level of 6.15 using 7.6 N ammonium hydroxide solution. The ammonium hydroxide solution is aqueous, or its solvent is a mixture of water and an aliphatic alcohol such as propanol. The solutions were applied on glass microscope slides after various shelf times. The haze results are shown in Table 3.

TABLE 3

|  | Haze (%) | | |
|---|---|---|---|
| Time After Catalysis (Hours) | CE6 | CE7 | E2 |
| 1 | 0.23 | 0.27 | 0.17 |
| 18 | 0.21 | 0.23 | 0.27 |
| 25.5 | 0.23 | 0.22 | 6.97 |
| 41.5 | 0.23 | 0.18 | 3.62 |
| 48.5 | 0.14 | 0.19 | 3.75 |

For another set of baths CE6, CE7, and E2, the same amount of acidified 5% TMAA solution was added and the baths were stirred slowly at room temperature for 68.5 hours before they were applied to glass microscope slides. The haze results are shown in Table 4.

TABLE 4

|  | Haze (%) |
|---|---|
| CE6 | 0.16 |
| CE7 | 0.18 |
| E2 | 0.14 |

These results demonstrate that for aminosilane doped polysiloxane coating bath (E2), the shelf life was extended from less than 25.5 hours to 68.5 hours or longer under low pH conditions (i.e., when acidified 5% TMAA was used).

The baths catalyzed with acidified TMAA solutions were also applied to PET films using a No. 16 wire-wound Meyer coating rod to give a dried coating thickness of about 2.3 μm. The PET films used here are 6.5 mil (0.17 mm) thick clear PET films that were chemically treated in-line with a cross-linked poly(allyl amine) bath, as taught in U.S. Pat. No. 7,189,457 (available from DuPont Teijin Films under tradename MELINEX™ 535). Each of the coated films was allowed to dry at room temperature and then stacked, in order, with a 30 mil (0.76 mm) thick PVB interlayer sheet and a sheet of glass and to form a pre-lamination assembly. The assemblies were placed in plastic vacuum bags and the bags were evacuated, sealed, and autoclaved at 135° C. for 30 minutes under a pressure of about 200 psi (13.8 bar). During the lamination process, a glass cover plate was used against the film side of the assembly. The coverplate was removed after autoclaving.

The resulting laminates were measured for b* color, haze, $T_{vis}$, and hardcoat-PET adhesion both before and after immersion in boiling water for 6 hours. The laminates were also inspected for blisters in the hardcoat after the 6-hour immersion in boiling water. Results are tabulated in Table 5. They demonstrate that all three hardcoat formulations show excellent adhesion retention on the PET films before any boiling water exposure. After immersion in boiling water for 6 hours, however, the hardcoat derived the polysiloxane coating bath doped with aminosilane (E2) showed far superior adhesion retention over the hardcoat derived from the polysiloxane coating bath without dopant (CE6) or the polysiloxane coating bath doped with epoxy-silane (CE7). In addition, the optical properties for E2 remained comparable to those of CE6 and CE7.

The polysiloxane main bath and the aminosilane dopant bath were each divided into three equal parts and combined under different conditions to make coating baths CE8, CE9, and E3.

CE8 was prepared by adding one third of the aminosilane dopant bath into one third of the polysiloxane main bath. Using a pipette, as the dopant bath was added below the surface of the stirring main bath, the bath immediately started to cloud up. When the addition of dopant bath was completed, the resultant bath CE8 was still liquid but quite cloudy. The cloudy CE8 bath was then further catalyzed with 1.71 ml acidified 5% TMAA. The pH of CE8 was measured as 5.1 before catalyzation and 5.3 after catalyzation. A glass microscope slide coated with dried bath CE8 had a haze level of 99.2%.

E3 was prepared similarly to CE8, except that for every 6 ml of the dopant bath that was added into the main bath, 1 ml of glacial acetic acid was added simultaneously. The resultant bath E3 was much less cloudy compared to CE8. Bath E3 was then further catalyzed with 2.2 ml acidified 5% TMAA. The pH of E3 was measured as 4.33 before catalysis and 4.46 after catalysis. A glass microscope slide coated with dried bath E3 had a haze level of 0.28%.

TABLE 5

| | Silane Dopant (wt %)[1] | | PET | Haze | $T_{vis}$ | b* | Hardcoat to PET Adhesion | | Overall | Boil | Speckling |
|---|---|---|---|---|---|---|---|---|---|---|---|
| | Epoxy- | Amino- | Film[5] | (%) | (%) | color | As-claved[4,6] | 6 hr Boil[6] | Rating[2] | Rating[3] | (N/cm²) |
| CE6 | 0 | 0 | Inside | 1.73 | 91.4 | 1.24 | 5/100/5-5 | 1-0/5/0-0 | 50 | 0 | 106/0.155 |
| | | | Outside | 1.87 | 91.3 | 1.25 | 5/100/5-5 | 0-0/0/0-0 | 50 | 0 | 520/0.294 |
| CE7 | 1.14 | 0 | Inside | 1.88 | 91.4 | 1.25 | 5/100/5-5 | 5/0/0-0 | 50 | 0 | 106/0.288 |
| | | | Outside | 1.97 | 91.2 | 1.25 | 5/100/5-5 | 0/0/0-0 | 50 | 0 | 2580/0.19 |
| E2 | 0 | 0.85 | Inside | 2.09 | 91.1 | 1.27 | 5/100/5-5 | 4/98/4-3 | 90 | 80 | 0 |
| | | | Outside | 2.02 | 91.3 | 1.27 | 5/100/5-5 | 4/99/3-3 | 88 | 76 | 1/0.096 |

[1] Weight percent (wt %) in bath before drying;
[2] Rating based on As-claved results plus boil results: 100 = total adhesion retension, 0 = no adhesion retension;
[3] Rating based on boil results only: 100 = total adhesion retension, 0 = no adhesion retention;
[4] After the autoclave lamination process and before the immersion in boiling water;
[5] Inside: hardcoat applied to the PET film side that is facing the roller of the film roll; Outside: hardcoat applied to the PET film side that is opposite from the roller of the film roll.
[6] The results are listed as "cross-cut"/"no cut"/"X-cut".

Comparative Examples CE8 and CE9 and Example E3

CE8, CE9, and E3 were polysiloxane coating baths prepared from a polysiloxane main bath and an aminosilane dopant bath.

The polysiloxane main bath was prepared by (a) de-ionizing 100 g of colloidal silica solution using mixed ion-exchange resin beads; (b) further acidifying the de-ionized colloidal silica solution with 0.347 ml glacial acetic acid; (c) adding 73.7 g methyltrimethyoxysilane into the de-ionized and acidified colloidal silica solution; (d) stirring the solution for 2 hours to effect hydrolysis; (e) diluting the solution with 106.8 g IPA/H$_2$O (2:1); and (f) further stirring the solution at room temperature for 6 hours.

The aminosilane dopant bath was prepared by (a) adding 12.12 g γ-aminopropyltrimethoxysilane, with stirring, into a solution of 40 g de-ionized water and 7 ml glacial acetic acid; (b) stirring the solution for 2 hours to effect hydrolysis; (c) diluting the solution with 80 g isopropanol; and (d) further stirring the solution at room temperature for 6 hours.

In preparing CE9, the polysiloxane main bath and the aminosilane dopant bath were each acidified with concentrated hydrochloric acid (HCl) (36%) before they were combined. In particular, the pH of the main bath (107.37 g) was reduced from 3.08 to 1.54 by addition of 0.5 ml HCl. The pH of the dopant bath (53.75 g) was first reduced from 5.15 to 5.00 by addition of 0.5 ml HCl and then further reduced to 3.4 by further addition of 1.5 ml HCl. The acidified dopant bath, which turned slightly cloudy, was then added to the acidified main bath with vigorous stirring and the resulting bath CE9 was clear and colorless. CE9 was further catalyzed with 2.5 ml of acidified 5% TMAA and had a final pH of 1.59. A glass microscope slide coated with dried bath CE9 had a haze level of 71.9%.

These examples demonstrated that, to avoid gelling, the dopant aminosilane must be hydrolyzed separately from the silica/silane hydrolysis mix and that both baths must be kept acidic when mixed. However, use of a strong acid, such as HCl, is not recommended, at least at the levels used in these examples.

Comparative Examples CE10, CE11 and CE12 and Examples E4, E5 and E6

CE10 was a control polysiloxane coating bath doped with an epoxy-silane. A polysiloxane main bath was prepared by adding 73.7 g methyltrimethoxysilane, with rapid stirring, into 100 g de-ionized colloidal silica solution that was acidified with 4 ml glacial acetic acid; cooling the bath to room temperature in a water bath; continuing stirring the bath at room temperature for 4 hours; diluting the bath with a solution made of 35.63 g de-ionized water and 104.9 g isopropanol; and further stirring the bath for one hour. An epoxy-silane dopant bath was prepared by adding 8 g γ-glycidoxypropyltrimethoxysilane into 40 g water that was acidified by 4 ml glacial acetic acid; cooling the bath to room temperature in a water bath; continuing stirring the bath at room temperature for 4 hours; diluting the bath with 46.37 g isopropanol; and further stirring the bath for one hour. The final dopant bath (pH=3.24) was then added to the main bath (pH=3.52) with rapid stirring to give a final epoxy-silane doped polysiloxane coating bath CE10, which was clear and slightly opalescent and had a pH of 3.55. CE10 was further catalyzed with 6.41 ml (5.63 g) of 5% TMAA and stirred at room temperature overnight before use. After catalyzation, bath CE10 had a pH of 4.39. A glass microscope slide coated with dried bath CE10 had a haze level of 0.23%.

E4 and E5 were both polysiloxane coating baths doped with aminosilanes. The polysiloxane main bath used here was prepared by adding 73.7 g methyltrimethoxysilane with rapid stirring into 100 g de-ionized colloidal silica solution that was acidified with 12 ml glacial acetic acid; cooling the bath to room temperature in a water bath; continuing stirring the bath at room temperature for 4 hours; diluting the bath with a solution made of 35.63 g de-ionized water and 104.9 g isopropanol; and further stirring the bath for one hour. The aminosilane dopant bath used here was prepared by adding 6.06 g γ-aminopropyltrimethoxysilane into 40 g de-ionized water that was acidified by 10 ml glacial acetic acid; cooling the bath to room temperature in a water bath; continuing stirring the bath at room temperature for 4 hours; diluting the bath with 46.37 g isopropanol; and further stirring the bath for one hour. To make E4, half of the main bath was added slowly to half of the dopant bath with rapid stirring. The resulting E4 was clear and slightly opalescent and had a pH of 4.29. An aliquot of E4, weighing 214 g, was further catalyzed with 3.29 ml acidified 5% TMAA and aged at room temperature for about 18 hours before use. The final E4 had a pH of 4.43 after catalyzation.

E5 was prepared similarly except that half of the dopant bath was added into half of the main bath with rapid stirring. The resulting E5 was also clear and slightly opalescent and had a pH of 4.4. E5 was also further catalyzed with 3.29 ml acidified 5% TMAA and aged at room temperature for about 18 hours before use. The final E5 had a pH of 4.49 after catalysis. A glass microscope slide coated with either dried bath E4 or dried bath E5 had a haze level of 0.18%.

E6 was a polysiloxane coating bath doped with both aminosilane and epoxy-silane. The polysiloxane main bath used here was prepared by adding 73.7 g methyltrimethoxysilane and 8 g γ-glycidoxypropyltrimethoxy silane with rapid stirring, into 100 g de-ionized colloidal silica solution that was acidified to a pH level of 2.23 with 12 ml glacial acetic acid; cooling the bath to room temperature in a water bath; continuing stirring the bath at room temperature for 4 hours; diluting the bath with a solution made of 35.63 g de-ionized water and 104.9 g isopropanol; and further stirring the bath for one hour. The aminosilane dopant bath used here was prepared by adding 6.06 g γ-aminopropyltrimethoxysilane into 40 g de-ionized water that was acidified to a pH level of 2.12 by 10 ml glacial acetic acid; cooling the bath to room temperature in a water bath; continuing stirring the bath at room temperature for 4 hours; diluting the bath with 46.37 g isopropanol; and further stirring the bath for one hour. Using a long-stemmed glass funnel, the main bath (pH=4.38) was added slowly below the surface of the rapidly stirred dopant bath. The resulting E6 was clear and slightly opalescent and had a pH of 4.55. An aliquot of E6, weighing 426.63 g, was further catalyzed with 6.56 ml acidified 5% TMAA and aged at room temperature for 72 hours before use. The final E6 had a pH of 4.45 after catalysis. A glass microscope slide coated with dried bath E6 had a haze level of 0.18%.

CE11 was a polysiloxane coating bath doped with twice as much aminosilane as in E4 or E5. The polysiloxane main bath used here was prepared by adding 73.7 g methyltrimethoxysilane, with rapid stirring, into 100 g de-ionized colloidal silica solution that was acidified to a pH level of 1.99 with 24 ml glacial acetic acid; cooling the bath to room temperature in a water bath; continuing stirring the bath at room temperature for 4 hours; diluting the bath with a solution of 35.63 g de-ionized water and 104.9 g isopropanol; and further stirring the bath for one hour. The aminosilane dopant bath used here was prepared by adding 12.12 g γ-aminopropyltrimethoxysilane into 40 g de-ionized water that was acidified to a pH level of 1.92 by 20 ml glacial acetic acid; cooling the bath to room temperature in a water bath; continuing stirring the bath at room temperature for 4 hours; diluting the bath with 46.37 g isopropanol; and further stirring the bath for one hour. Using a long-stemmed glass funnel, the main bath was added slowly below the surface of the rapidly stirred dopant bath and the resulting CE11 was clear and slightly opalescent and had a pH of 4.37. CE11, weighed 448.79 g, was further catalyzed with 6.9 ml acidified 5% TMAA and aged at room temperature for 72 hours before use. The final CE11 had a pH of 4.28 after catalysis. A glass microscope slide coated with dried bath E6 had a haze level of 0.17%.

CE12 was a polysiloxane coating bath doped with the same amount of epoxy-silane and twice as much aminosilane as in E6. The polysiloxane main bath used here was prepared by adding 73.7 g methyltrimethoxysilane and 8 g γ-glycidoxypropyltrimethoxy silane with rapid stirring, into 100 g de-ionized colloidal silica solution that was acidified with 24 ml glacial acetic acid; cooling the bath to room temperature in a water bath; continuing stirring the bath at room temperature for 4 hours; diluting the bath with a solution of 35.63 g de-ionized water and 104.9 g isopropanol; and further stirring the bath for one hour. The aminosilane dopant bath used here was prepared by adding 12.12 g γ-aminopropyltrimethoxysilane into 40 g de-ionized water that was acidified with 20 ml glacial acetic acid; cooling the bath to room temperature in a water bath; continuing stirring the bath at room temperature for 4 hours; diluting the bath with 46.37 g isopropanol; and further stirring the bath for one hour. Using a long-stemmed glass funnel, the main bath (pH=3.63) was added slowly below the surface of the rapidly stirred dopant bath B (pH=4.15) and the resulting CE12 was clear and slightly opalescent and had a pH of 4.13. CE12 was further catalyzed with 7.08 ml acidified 5% TMAA and aged at room temperature for 77 hours before use. The final CE12 had a pH of 4.21 after catalyzation. A glass microscope slide coated with hard-coat derived from CE12 had a haze level of 0.14%.

Similarly to the process described above for CE6, CE7 and E2, coating baths CE10, CE11, CE12 and E4, E5, E6 were applied to 6.5 mil (0.17 mm) thick poly(allyl amine) primed PET films, which were further laminated to glass sheets with PVB interlayer sheets in between. The resulting laminates were then measured for b* color, haze, $T_{vis}$, Taber delta haze, and hardcoat-PET adhesion both before and after immersion in boiling water for 2 or 6 hours. Results, tabulated in Table 6, demonstrate that hardcoats derived from polysiloxane coating baths E4 and E5 (doped with 1.39 wt % of aminosilane) give the best adhesion and the least blistering. Moreover, E4 and E5 had haze levels only slightly higher than that of the hardcoat derived from polysiloxane coating bath CE10 (doped with 1.91 wt % of epoxy-silane). On the other hand, as illustrated by E6, a polysiloxane coating bath doped with both epoxy- and aminosilanes did not confer any advantage over those doped with aminosilane alone. Moreover, polysiloxane coating bath doped with a higher amount of aminosilanes (e.g., about 2 wt % or more, based on the total weight of the coating composition) might compromise the resistance to blistering of the hardcoat derived therefrom.

TABLE 6

| | Silane Dopant (%)[1] | | PET Film[5] | Haze (%) | Tvis (%) | b* color | Taber Delta Haze (%) | Hardcoat-to-PET Adhesion | | | Overall Rating[2] | Boil Rating[3] |
|---|---|---|---|---|---|---|---|---|---|---|---|---|
| | Epoxy- | Amino- | | | | | | As-claved[4,6] | 2 Hour Boil | 6 Hour Boil | | |
| CE10 | 1.91 | 0 | Inside | 1.95 | 91.6 | 1.26 | 1.94 | 5/100/5-5 | 5/100/5-5 | 0/10/1-1 | 71 | 56 |
| | | | Outside | 1.82 | 91.5 | 1.26 | 2.31 | 5/100/5-5 | 5/100/5-5 | 0/2/0-0 | 67 | 50 |
| E4 | 0 | 1.39 | Inside | 1.83 | 91.3 | 1.26 | 1.94 | 5/100/5-5 | 5/100/5-5 | 3/40/2-2 | 81 | 72 |
| | | | Outside | 1.98 | 91.4 | 1.29 | 1.85 | 5/100/5-5 | 5/100/5-5 | 2/95/4-4 | 92 | 88 |
| E5 | 0 | 1.39 | Inside | 2.02 | 91.5 | 1.31 | 2.13 | 5/100/5-5 | 5/99/5-5 | 3/95/1-2 | 85 | 76 |
| | | | Outside | 2.05 | 91.3 | 1.28 | 1.85 | 5/100/5-5 | 5/100/5-5 | 0/85/3-2 | 84 | 76 |
| E6 | 1.85 | 1.4 | Inside | 1.83 | 91.5 | 1.29 | 1.3 | 5/100/5-5 | 5/100/5-5 | 3/85/1-1 | 81 | 72 |
| CE11 | 0 | 2.73 | Inside | 1.98 | 91.5 | 1.33 | 1.66 | 5/100/5-5 | 5/100/5-5 | 1/20/1-1 | 69 | 54 |
| CE12 | 1.77 | 2.68 | Inside | 1.65 | 91.5 | 1.3 | 1.11 | 5/100/5-5 | 5/100/5-5 | 0/2/0-0 | 52 | 28 |

[1]Weight percent (wt %) in bath before drying;
[2]Rating based on As-claved results plus boil results: 100 = total adhesion retension, 0 = no adhesion retension;
[3]Rating based on boil results only: 100 = total adhesion retension, 0 = no adhesion retention;
[4]After the autoclave lamination process and before the immersion in boiling water;
[5]Inside: hardcoat applied to the PET film side that is facing the roller of the film roll; Outside: hardcoat applied ot the PET film side that is opposite from the roller of the film roll.
[6]The results are listed as "cross-cut"/"no cut"/"X-cut".

While certain of the preferred embodiments of this invention have been described and specifically exemplified above, it is not intended that the invention be limited to such embodiments. Various modifications may be made without departing from the scope and spirit of the invention, as set forth in the following claims.

The invention claimed is:

1. A polysiloxane coating composition comprising
   (a) about 5 to about 50 wt % of solids comprising about 2 to about 30 wt % of a silica, about 0.25 to about 9 wt % of a partial condensate of an aminosilane, and about 2 to about 90 wt % of a partial condensate of a tri-functional silane having a formula RSi(OR')$_3$, wherein R is selected from the group consisting of alkyl, vinyl, and aryl radicals and R' is selected from the group consisting of H., alkyl radicals having 1 to 4 carbons, and alkylcarbonyl radicals having 1 to 4 carbons; and
   (b) about 50 to 95 wt % of a solvent comprising about 10 to about 90 wt % of a lower aliphatic alcohol and about 10 to about 90 wt % of water; and wherein the coating composition is prepared by;
      (i) dispersing and mixing the tri-functional silane into a water-based solution of polysilicic acid or a colloidal suspension of silica, which has a pH level of about 2 to about 6, to form a bath A;
      (ii) dispersing and mixing the aminosilane into water, which is acidified to a pH level of about 2 to about 6, to form formation a bath B; and
      (iii) diluting the baths A and B with a mixture of the lower aliphatic alcohol and water and combining the diluted baths A and B to form the coating composition;
   wherein the sum of the weight percentages of the silica and the partial condensates in (a) is 100%, wherein the aminosilane is γ-aminopropyltrimethoxysilane.

2. The coating composition of claim 1, wherein the partial condensate of the aminosilane is present at about 0.25 to about 7 wt % in the solids.

3. The coating composition of claim 1, which is essentially free of alkali metal ions and further comprises about 0.01 to about 1.5 wt % of a curing catalyst, based on the total weight of the composition.

4. The coating composition of claim 3, wherein the curing catalyst is selected from the group consisting of alkali metal salts of carboxylic acids and quaternary ammonium carboxylates.

5. The coating composition of claim 4, wherein the curing catalyst is selected from the group consisting of benzyltrimethylammonium acetate and tetramethylammonium acetate.

6. An article comprising a substrate, wherein at least one side of the substrate is coated in whole or in part with a primer comprising a poly(alkyl amine) and over at least a portion of which primer coating an abrasion resistant hardcoat is formed from the polysiloxane coating composition of claim 1.

7. The article of claim 6, wherein the abrasion resistant hardcoat is formed by drying the polysiloxane coating composition at room temperature for about 30 minutes or longer.

8. The article of claim 6, wherein the abrasion resistant hardcoat is formed by curing the polysiloxane coating composition at about 90° C. or higher for about 2 seconds or longer.

9. The article of claim 6, wherein the substrate is a polymeric film selected from the group consisting of films of acrylic polymers, polyesters, polycarbonates, polyamides, polyimides, acrylonitrile-styrene copolymers, styrene-acrylonitrile-butadiene copolymers, polyvinyl chloride, butyrates, and polyethylenes; wherein the primer layer has a thickness of up to about 1,000 nm and comprises a poly(allyl amine); and wherein the abrasion resistant hardcoat has a thickness of up to about 100 μm.

10. The article of claim 9, wherein the substrate is a poly(ethylene terephthalate) film having one surface coated with the poly(allyl amine) primer layer and over which is disposed the abrasion resistant hardcoat, said abrasion resistant hardcoat having a thickness of about 0.5 to about 20 μm.

11. The article of claim 10, which is a safety laminate further comprising a polymeric interlayer sheet laminated to the poly(ethylene terephthalate) film on the surface that is opposite from surface on which the abrasion resistant hardcoat is disposed.

12. The article of claim 11, wherein the polymeric interlayer sheet comprises a material selected from the group consisting of poly(vinyl acetals), poly(vinyl chlorides), polyurethanes, poly(ethylene vinyl acetates), copolymers of α-olefins and α,β-unsaturated carboxylic acids having from 3 to 8 carbons, ionomers derived from partially or fully neutralized copolymers of α-olefins and α,β-unsaturated carboxylic acids having from 3 to 8 carbons, and combinations of two or more thereof.

13. The article of claim 11, wherein the polymeric interlayer sheet comprises a poly(vinyl butyral).

14. The article of claim 11, further comprising a rigid sheet or an additional film layer laminated to the polymeric interlayer sheet opposite from the hardcoated poly(ethylene terephthalate) film.

15. The article of claim 14, wherein the rigid sheet comprises a material with a modulus of about 100,000 psi (690 MPa) or greater, as measured by ASTM method D-638 and is selected from the group consisting of glass sheets, metal sheets, ceramic sheets, and polymeric sheets.

16. The article of claim 14, wherein the additional film layer comprises a material selected from the group consisting of polyesters, polycarbonates, polyolefins, norbornene polymers, polystyrenes, styrene-acrylate copolymers, acrylonitrile-styrene copolymers, polysulfones, nylons, polyurethanes, acrylics, cellulose acetates, cellophanes, vinyl chloride polymers, and fluoropolymers.

17. The article of claim 13, further comprising a glass sheet laminated to the poly(vinyl butyral) interlayer sheet opposite from the hardcoated poly(ethylene terephthalate) film.

18. The article of claim 13, further comprising a second poly(ethylene terephthalate) film, wherein a first surface of the second poly(ethylene terephthalate) film is laminated to the poly(vinyl butyral) interlayer sheet, and wherein a second surface of the second poly(ethylene terephthalate) film is coated with a second primer layer comprising a poly(allyl amine) and over which a second abrasion resistant hardcoat formed from the polysiloxane coating composition.

19. The article of claim 11, further comprising n plies of rigid sheets or additional film layers and n−1 plies of additional polymeric interlayer sheets, wherein $1 \leq n \leq 7$, and wherein the n plies of rigid sheets or additional film layers are interspaced by the n−1 plies of additional polymeric interlayer sheets to form an intermediate assembly; and further wherein the intermediate assembly is laminated to the polymeric interlayer sheet.

20. A process for preparing a polysiloxane coating composition of claim 1 comprising the steps of:
  (i) dispersing and mixing a tri-functional silane into a water-based solution of polysilicic acid or a colloidal suspension of silica, which has a pH level of about 2 to about 6, to form a bath A;
  (ii) dispersing and mixing an aminosilane into water, which is acidified to a pH level of about 2 to about 6, to form a bath B; and
  (iii) diluting the baths A and B with a mixture of the lower aliphatic alcohol and water and combining the diluted baths A and B to form the coating composition, wherein, the tri-functional silane has a formula of $RSi(OR')_3$, with R being selected from the group consisting of alkyl, vinyl, and aryl radicals and R' being selected from the group consisting of H., alkyl radicals having 1 to 4 carbons, and alkylcarbonyl radicals having 1 to 4 carbons wherein the aminosilane is γ-aminopropyltrimethoxysilane.

21. The process of claim 20, wherein (A) the water-based solution of polysilicic acid or the colloidal suspension of silica is de-ionized and essentially free of alkali metal ions; (B) the water used in step (ii) is de-ionized water; and (C) further comprising the step of (iv) adding about 0.01 to about 1 wt % of a curing catalyst into the coating composition obtained from step (iii).

22. The process of claim 21, wherein the curing catalyst is selected from the group consisting of alkali metal salts of carboxylic acids and quaternary ammonium carboxylates.

23. The process of claim 22, wherein the curing catalyst is selected from the group consisting of benzyltrimethylammonium acetate and tetramethylammonium acetate.

* * * * *